United States Patent [19]

Amano et al.

[11] Patent Number: 4,629,946
[45] Date of Patent: Dec. 16, 1986

[54] NEON SIGN CONTROL DEVICE

[75] Inventors: Shintetsu Amano; Hajime Okada; Teruyuki Yakuda; Isao Hori; Yoshinori Mizuhata, all of Gifu, Japan

[73] Assignee: Kabushiki Kaisha Sanyo Denki Seisakusho, Gifu, Japan

[21] Appl. No.: 718,320

[22] Filed: Apr. 1, 1985

[30] Foreign Application Priority Data

Apr. 4, 1986 [JP] Japan ................................. 59-68124
Nov. 14, 1984 [JP] Japan ........................... 59-173435[U]
Nov. 16, 1984 [JP] Japan ........................... 59-174488[U]

[51] Int. Cl.$^4$ ........................................... H05B 37/02
[52] U.S. Cl. .................................... 315/219; 315/76; 315/156; 315/158; 40/545; 40/581
[58] Field of Search ................ 315/76, 219, 156, 158; 340/718; 40/545, 581

[56] References Cited

U.S. PATENT DOCUMENTS

| | | | |
|---|---|---|---|
| 2,877,384 | 3/1959 | Gould | 40/902 |
| 3,411,036 | 1/1969 | Casey | 315/158 |
| 3,483,429 | 12/1969 | Engel et al. | 315/156 |
| 3,789,211 | 1/1974 | Kramer | 40/902 |
| 4,087,722 | 5/1978 | Hancock | 315/136 |
| 4,209,728 | 1/1980 | Membreno | 315/156 |

Primary Examiner—Harold Dixon
Attorney, Agent, or Firm—Pollock, Vande Sande and Priddy

[57] ABSTRACT

In a neon sign control device, a.c. power of an a.c. power source is connected to a neon transformer through an electronic switching element, a control signal from a control signal generator is supplied to a trigger circuit, the trigger circuit generates a trigger signal while the control signal is supplied, and the electronic switching element is rendered on by the trigger signal, whereby a.c. power is supplied to the neon transformer, and neon tubes connected to a secondary winding of the neon transformer are lit. A control unit composed of at least the electronic switching element and the trigger circuit is installed inside or outside of the transformer housing or disposed near the housing.

25 Claims, 26 Drawing Figures

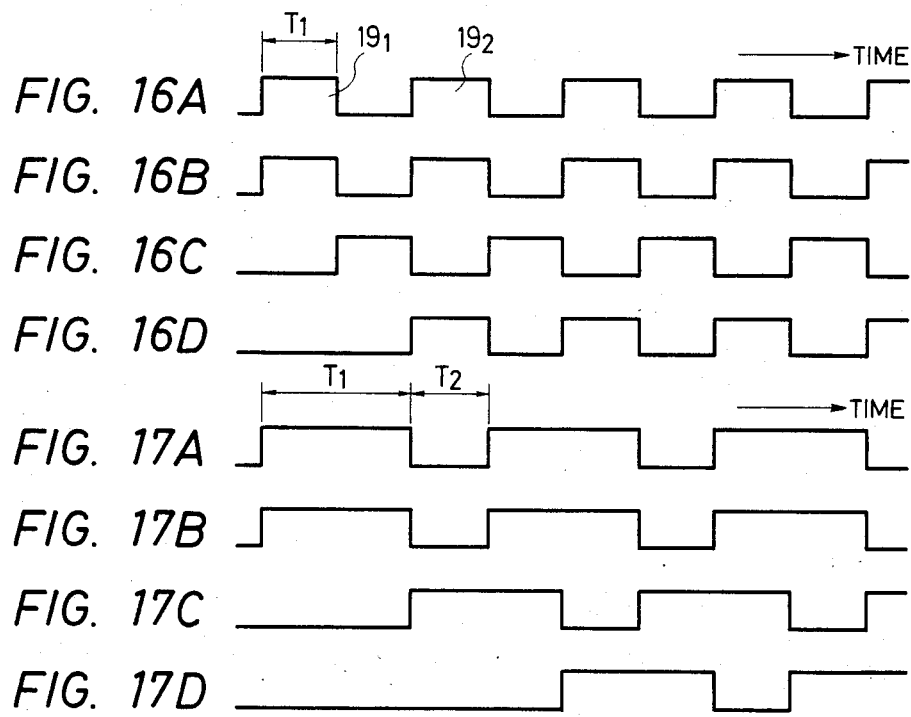

NEON SIGN CONTROL DEVICE

BACKGROUND OF THE INVENTION

The present invention relates to neon sign control devices which perform switching and brightness adjustment of discharge tubes for decorative illumination, such as a neon tube or an argon tube.

In order to light discharge tubes for decorative illumination such as a neon tube sign or an argon tube sign (hereinafter referred to as "neon sign"), a special transformer of magnetic leakage type (hereinafter referred to as "neon transformer") has been used. The primary side of a neon transformer is turned on and off using a mechanical contact system comprising a brush and a rotary drum; thereby an a.c. current is supplied and interrupted to the neon transformer so as to perform switching control of a neon tube connected to the secondary side of the neon transformer.

In such a switching system of the prior art, however, use of mechanical contacts may cause problems due to contact abrasion, contact failure or insulation failure. Contacts of working state are liable to abnormal heating resulting in a fire. Consequently, the system has problems not only in function but also in prevention of disasters, and much labor is required for maintenance control. The neon tubes and the neon transformers are usually mounted on a so-called advertising pillar installed on a roof of a building, and the switching control device is installed indoors remote from the advertising pillar. Consequently, wiring between the switching control device and the neon transformers must be performed inconveniently using thick wires over a long distance. As the scale of the neon advertising pillar becomes large, the wiring amount is significantly increased and therefore the manufacturing cost is increased.

Switching operation at the primary side of the neon transformer is accompanied by on/off operation of large current which generates electric noise to affect radio apparatuses adversely. This has caused a social problem.

In a relatively large advertising pillar, a plurality of neon transformers are used and neon tubes connected to the neon transformers are controlled in various flashing modes, for example. In order to obtain the intended flashing mode in the prior art, the lengths of contact segments on a rotary drum for the respective neon transformers, and their positions in the circumferential direction are selected. However, the device becomes large in such an arrangement and has many disadvantages as above described. Furthermore, in order to vary the flashing mode, the rotary drum must be exchanged and this is troublesome and involves high cost.

In general, neon signs for advertisement, irrespective of their scale, are lit when it becomes dark in the evening and put out after a definite time (at night) in consideration of economy. If the scale of the advertising neon signs is large, the turning on and off of a power switch are performed automatically. If it is small, control of turning on and off of a power switch is usually performed in manual operation. This is because the automatic control requires a relay, a timer and the like separately and therefore the device becomes expensive and the construction cost causes a serious problem in expense. Use of a timer of the motor type or spring type and the mechanical contacts makes the life relatively short. Since the control device must be installed at a site which is prevented from wetting by rain and free from moisture, i.e. indoors, it is inevitably installed remote from the neon transformer and therefore the construction cost becomes high also from this aspect. When control is effected in manual operation, not only labor is required but also forgetting of the turning on/off of the power switch may occur. Consequently, the manual operation is not always performed economically.

SUMMARY OF THE INVENTION

A first object of the invention is to provide a neon sign control device wherein the whole structure is made significantly small, the wiring is significantly reduced, and there is little generation of noise.

A second object of the invention is to provide a neon sign control device which attains the first object and enables a complicated switching control.

A third object of the invention is to provide a neon sign control device which attains the first object and enables the starting and ending of flashing operation of a neon sign in full automatic operation.

According to the invention, an electronic switching element having a control electrode is inserted in series with a primary winding of a neon transformer so that the electronic switching element is rendered on if the control electrode is supplied with a relatively weak trigger signal. In response to a control signal from a control signal generator, a trigger circuit generates a trigger signal, which is supplied to the control electrode of the electronic switching element. While the control signal is supplied to trigger circuit, a.c. power from an a.c. power source connected to the primary winding of the neon transformer through the switching element is supplied to the primary winding so as to turn on a neon tube connected to a secondary winding of the neon transformer. A control unit including at least the switching element and trigger circuit is mounted inside or outside a housing of the neon transformer or disposed near the housing. Since mechanical contacts are not used in such an arrangement the above-mentioned disadvantages in the prior art are eliminated. Further, since the control unit is installed near the neon transformer, the wiring is simplified.

The control signal generator may also be installed in the control unit. In this case, a power source circuit is connected to the a.c. power source side of the electronic switching element, and power for the control signal generator is obtained from the power source circuit. The power source circuit is also installed in the control unit. In this arrangement, wiring for the control signal can be substantially omitted.

The trigger circuit may be so constituted for example that a trigger signal is generated every half cycle of the a.c. power, and the trigger signal is preferably generated near the zero-crossing of the a.c. power.

When a plurality of neon transformers are installed in relatively close proximity to each other to constitute one neon sign advertising device, control units are mounted inside or outside of the respective housings of the neon transformers, and a control signal from a single control signal generator is supplied to the respective control units. In this case, if the control signal generator is installed in one of the control units, wirings for the control signal may be made only between the transformer housings of respective neon transformers. Transmission of the control signal between the transformer housings or transmission of the control signal when the control signal generator is installed separately from the respective housings, may be performed as a light signal using an optical fiber, thereby attaining such a control that is not liable to be affected by external noises.

A timer is installed in the control unit so that if the control signal to the trigger circuit is cut off, the timer circuit is started to produce a control signal for a preset time interval. Such a control unit may be mounted to each transformer housing, and the control units may be connected in series such that a control signal output terminal of one timer circuit in one of the control units may be connected to a control signal input terminal of another control unit. In other words, these control units are connected in cascade with respect to the control signal, so that the neon tubes of these transformer housings are turned on in sequence, thereby effecting so called traveling light spot action. Frequency and duty cycle of the control signal supplied to the initial stage of the cascade connection and the time of the timer circuit are selected so that whole neon tubes are turned on and off in various modes.

A brightness detecting circuit and a timer circuit are installed in the control unit and are so arranged that when the outside field becomes sufficiently dark in the evening, the darkness is detected by the brightness detecting circuit, the timer circuit is driven by the detection output, a gate circuit is opened by the timer output to pass therethrough the detection output and supply as a control signal to the trigger circuit, and the neon tube is turned on automatically. After lapse of time of the timer circuit, the gate circuit is closed and the control signal to the trigger circuit becomes zero, turning off the neon tube. Time of the timer circuit is preset so that the neon tube is turned off at mid night. Thus, the neon tube can be turned on and off automatically without necessitating manual operation. The timer circuit may be replaced by a clock circuit (timer circuit of 24 hours) so that the gate circuit is opened only during the time band set by the clock circuit (from a set clock time to another set clock time). When the timer circuit or the clock circuit is used, the gate circuit may be supplied with, for example, the output of an oscillator as a control signal so as to perform the starting and ending of the switching operation of the neon tube automatically.

Electrically isolated signal coupling means, such as a photo coupler, may be inserted at the control signal input side of the control unit so as to isolate the source for the trigger circuit from the power source for the control signal generator. Also signal coupling means may be inserted at the input side of the timer circuit which outputs the control signal to the control unit for a predetermined time at the rear end of the control signal.

BRIEF DESCRIPTION OF THE DRAWINGS

FIG. 16A through FIG. 16D are diagrams illustrating a working example where a traveling light spot action of 1/1 ON-OFF ratio is effected using the device shown in FIG. 15;

FIG. 17A through FIG. 17D are diagrams illustrating a working example where a traveling light spot action of 2/1 ON-OFF ratio is effected using the device shown in FIG. 15;

DETAILED DESCRIPTION OF THE PREFERRED EMBODIMENTS

Figure 1:
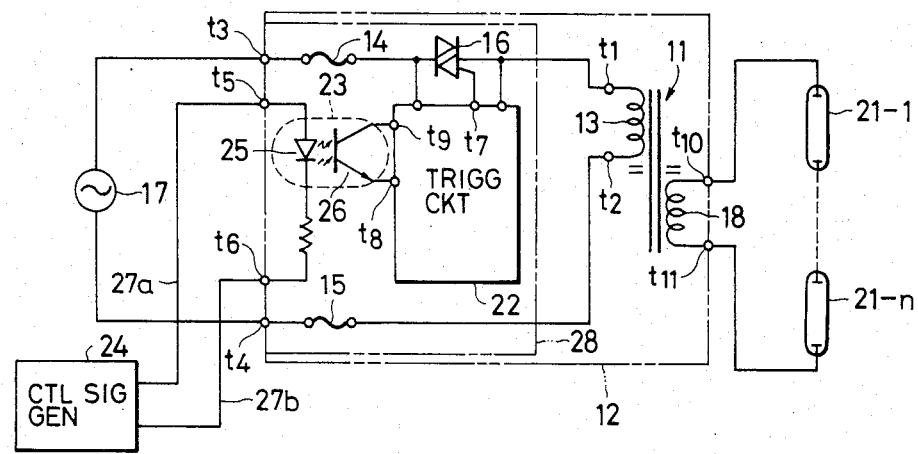
FIG. 1 is a circuit diagram of a neon sign control device as an embodiment of the invention.

FIG. 1 shows an embodiment of a neon sign control device according to the invention. A neon transformer 11 is mounted in a neon transformer housing 12, and between terminals $t_1$, $t_2$ at both ends of a primary winding 13 of the neon transformer 11 and input terminals $t_3$, $t_4$ of the neon transformer housing 12 are connected a fuse 14 and an electronic switching element 16 in series and a fuse 15, respectively. An a.c. power source 17 such as a commercial power line is connected to the input terminals $t_3$, $t_4$ of the housing 12. Neon tubes 21-1 to 21-$n$ are connected between both end terminals $t_{10}$, $t_{11}$ of a secondary winding 18 of the neon transformer 11.

In the embodiment, a triac is used as the electronic switching element 16 connected to the primary winding circuit of the neon transformer 11, and an output terminal $t_7$ of a trigger circuit 22 is connected to a gate terminal of the triac 16. A pair of output terminals of a photo coupler 23 are connected to input terminals $t_8$, $t_9$ of the trigger circuit 22. Input terminals $t_5$, $t_6$ of the photo coupler 23 are supplied with a control signal from a control signal generator 24 through transmission lines 27a, 27b. The photo coupler 23 serves to isolate the trigger circuit 22 from the transmission lines 27a, 27b in respect of d.c. component. If the isolation is not necessary, the terminals $t_5$, $t_6$ may be connected directly to the terminals $t_9$, $t_8$, respectively. Moreover, the d.c. isolation may be effected not only by the photo coupler 23 but also other d.c. isolating means.

If a control signal to turn on the neon tubes 21-1 to 21-$n$ is generated from the control signal generator 24, it is transmitted through the transmission lines 27a, 27b and supplied to the photo coupler 23. As a result, a light emitting diode 25 of the photo coupler 23 is turned on and therefore a photo transistor 26 of the photo coupler 23 is rendered on. If the photo transistor 26 is rendered on, the trigger circuit 22 is activated to generate the trigger signal, which is supplied through the output terminal $t_7$ to the gate terminal of the triac 16.

In response to the trigger signal applied to the gate terminal of the triac 16, the triac 16 is rendered conductive and a.c. power of the a.c. power source 17 is supplied between terminals $t_1$, $t_2$ of the primary winding 13 of the neon transformer 11 through the triac 16, thereby generating a high voltage on the secondary winding 18 of the neon transformer 11 to turn on the neon tubes 21-1 to 21-$n$.

Next, if the control signal from the control signal generator 24 is stopped, the light emitting diode 25 of the photo coupler 23 is turned off and the photo transistor 26 is rendered off. Consequently, the trigger signal from the trigger circuit 22 is not supplied to the switching element 16, i.e. the triac, plating the triac 16 in its off state. As a result, the power supply from the power source 17 to the primary winding 13 of the transformer 11 is stopped and therefore the neon tubes 21-1 to 21-$n$ are turned off.

Figure 2:
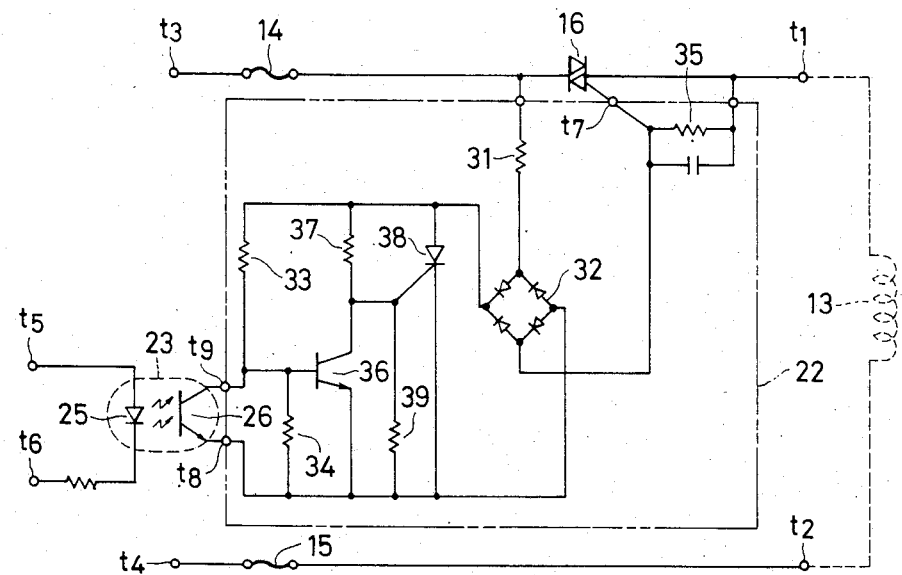
FIG. 2 is a circuit diagram of a specific example of a trigger circuit in FIG. 1.

FIG. 2 shows an example of the trigger circuit 22. A switching transistor 36 is always supplied with d.c. power from a pair of opposite output terminals of a full-wave rectifying diode bridge circuit 32 which is supplied, at another pair of opposite input terminals thereof, with the a.c. power from the terminals $t_3$ and $t_4$ via resistors 31 and 35. In the case where the control signal is not supplied across the terminals $t_5$, $t_6$ and the photo transistor 26 is rendered off the transistor 36 is rendered on by a voltage across a resistor 34, and therefore current flows through the circuit consisting of the terminal $t_3$ - the fuse 14 - the resistor 31 - the diode bridge circuit 32 - the resistor 37 - the transistor 36 - the diode bridge circuit 32 - the resistor 35 - the terminal $t_1$ - the primary winding 13 -the terminal $t_2$ - the fuse 15 - the terminal $t_4$. Accordingly, a resistor 39 connected between a gate and a cathode of a thyristor 38 is short-circuited by the transistor 36, that is, no voltage effective to ignite conduction is supplied to the gate of the thyristor 38 and therefore the thyristor 38 is retained in an off state.

If a control signal is supplied between the terminals $t_5$, $t_6$ and the photo transistor 26 is rendered on, the resistor 34 is short-circuited by the photo transistor 26 and base bias current is not supplied to the transistor 36; as a result, the transistor 36 is rendered off. Consequently, voltage across the resistor 39 rises and the gate of the thyristor 38 is supplied with a voltage to turn on the thyristor 38. The resistance value of the resistor 37 is selected to be large so that the current flowing through the thyristor 38 is sufficiently larger than that flowing through the resistor 37 in the case of the transistor 36 being in an on state. Therefore, when the thyristor 38 is turned on the large current causes an increase in the voltage across the resistor 35, thus generating a trigger voltage at the output terminal $t_7$ of the trigger circuit 22 to turn on the triac 16. The triac 16 becomes conductive every half cycle of a.c. power between terminals $t_3$, $t_4$.

Thus, in FIG. 1, the trigger circuit 22 acts to generate a trigger signal in response to the control signal from the control signal generator 24. Conduction of the switching element 16 is controlled by the trigger signal, and lighting control is carried out for the neon tubes 21-1 to 21-$n$ connected to the secondary winding 18 of the neon transformer 11.

Figure 3:
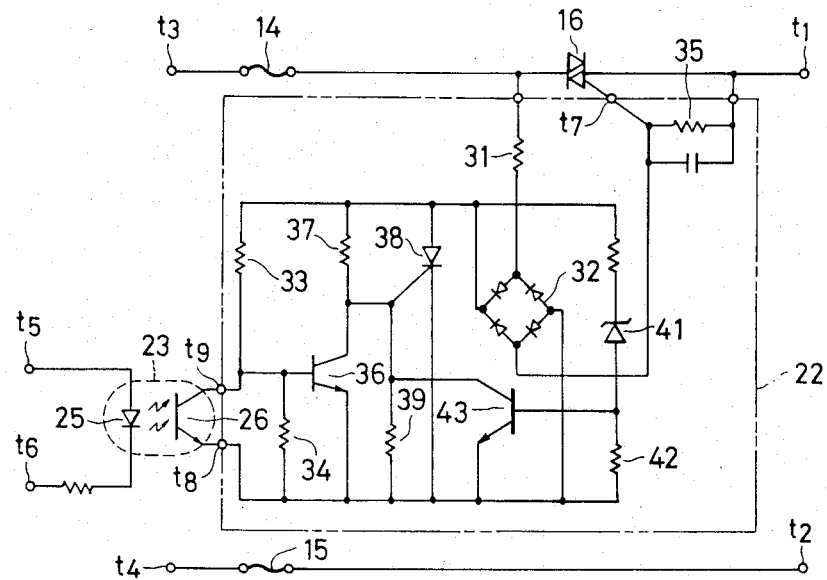
FIG. 3 is a circuit diagram of another example of a trigger circuit.

The trigger circuit 22 may be arranged as shown in FIG. 3. In FIG. 3, a series circuit of a constant voltage element 41 such as a Zener diode and a resistor 42 is connected at the load side of the diode bridge circuit 32 in the arrangement of FIG. 2, i.e. between the anode and cathode of the thyristor 38. The base of a transistor 43 is connected to the junction of the constant-voltage element 41 and the resistor 42, and the collector and emitter of the transistor 43 are connected to both ends of the resistor 39.

In this arrangement, when an instantaneous absolute value of a.c. voltage supplied between the terminals $t_3$ and $t_4$ exceeds a predetermined value corresponding to the constant voltage defined by the constant-voltage element, the constant-voltage element 41 is rendered on and hence the transistor 43 is rendered on. Accordingly, the resistor 39 is short-circuited and no voltage effective to turn on the thyristor 38 is supplied to the gate of the thyristor 38. Thus, the thyristor 38 is not rendered on even if the transistor 36 is rendered off by the control signal between the terminals $t_5$ and $t_6$. On the contrary, when the instantaneous absolute value of a.c. voltage supplied between the terminals $t_3$ and $t_4$ is smaller than the predetermined value, the transistor 43 is rendered off. Therefore, the thyristor 38 is rendered on when the transistor 36 is rendered off by the control signal between the terminals $t_5$ and $t_6$. Conduction of the triac 16 at large instantaneous absolute value of a.c. power is not preferable because large current flows abruptly. However, such undesirable circuit operation can be avoided in the arrangement of FIG. 3.

Figure 4:
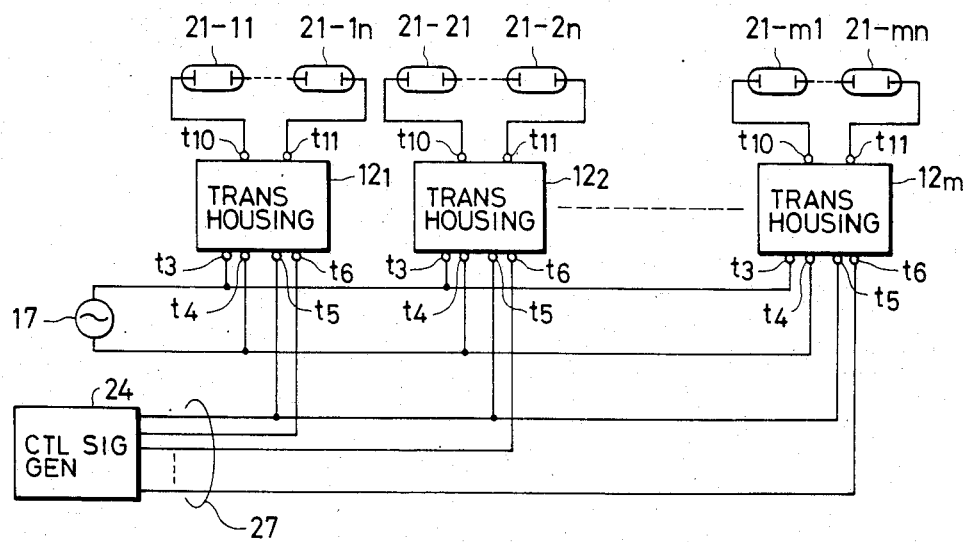
FIG. 4 is a block diagram illustrating an example of the controlling of neon transformers by a common control signal generator shown in FIG. 1.

Referring to FIG. 4, each of a plurality of neon transformer housings $12_1$ to $12_m$ has input terminals $t_3$, $t_4$ to which an a.c. power source 17 is connected in parallel, a control signal input terminal $t_5$ to which the common transmission line of the control signal generator 24 is connected, and another control signal input terminal $t_6$ to which individual transmission lines are connected. Neon tubes 21-11 . . . 21-1$n$, to 21-$m$1 . . . 21-$mn$ are connected between secondary output terminals $t_{10}$, $t_{11}$ of the neon transformer housings $12_1$-$12_m$, respectively. These neon tubes as a whole perform the neon sign display. Thus, only one control signal generator 24 may be provided to perform the control of a plurality of the neon transformers.

Figure 5:
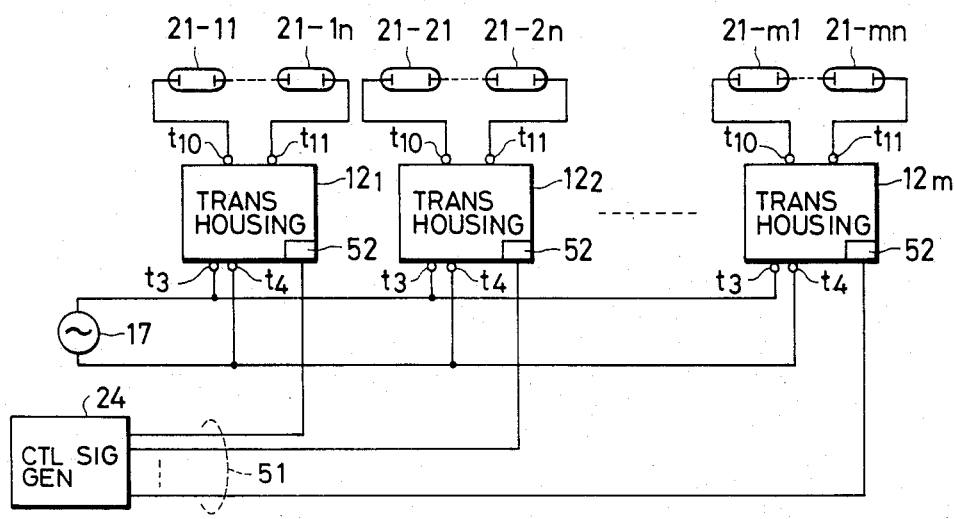
FIG. 5 is a block diagram illustrating use of an optical fiber for transmitting a control signal in FIG. 4.

In the invention, since the control signal is supplied to the trigger circuit 22 so as to perform the lighting control of neon tubes, the control signal from the control signal generator 24 may be supplied through an optical fiber 51 as an optical signal to the neon transformer housings $12_1$-$12_m$ as shown in FIG. 5. The optical control signal received at the housings $12_1$-$12_m$ is converted by each photo-electric conversion element 52 such as a photo-transistor into an electric control signal which may be supplied between the terminals $t_8$ and $t_9$ of each trigger circuit 22 as shown in FIG. 1.

Figure 6:
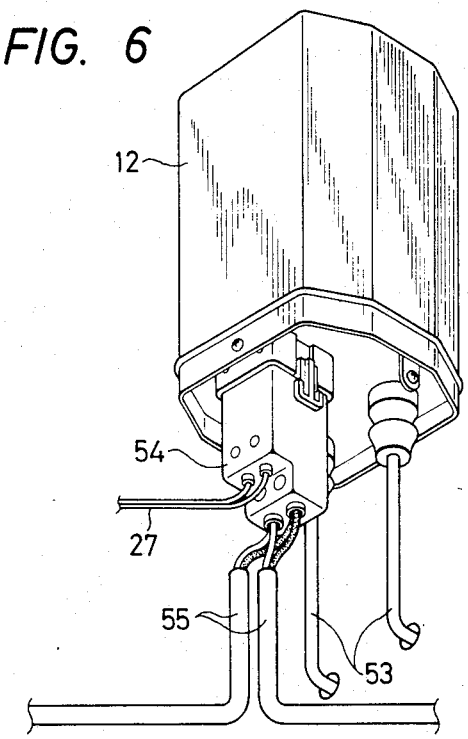
FIG. 6 is a perspective view illustrating the appearance of a neon transformer housing and a connector.

Although the control unit 28 between the terminals $t_3$ - $t_6$ and the terminals $t_1$, $t_2$ in FIG. 1 has been explained as to be installed in the neon transformer housing 12 in the foregoing embodiments, it may be also installed outside the housing. For example, the control unit 28 may be mounted in a power connector 54 which is attached to the housing 12 as shown in FIG. 6, where wires 53 to be connected to neon tubes are drawn out of the neon transformer housing 12, and a power source connector 54 is detachably installed to the bottom surface of the housing 12, and power source wires 55 to be connected to the a.c. power source 17 are connected to the power source connector 54. The power source wires 55 pass through inside of the power source connector 54 and are electrically connected via the control unit 28 to the primary winding of the neon transformer in the housing 12 as shown in FIG. 1. The control unit 28 is enclosed in the power source connector 54 and installed to the housing 12. The transmission line 27 for the control signal to the control unit 28 is also connected to the power source connector 54.

Figure 7:
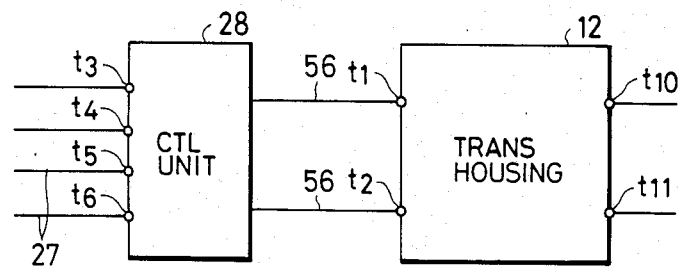
FIG. 7 is a diagram illustrating an example of the arrangement of a control unit near the transformer housing.

As shown in FIG. 7, the control unit 28 may be installed separately from but near the transformer housing 12, and both may be connected to each other through coupling wires 56.

Figure 8:
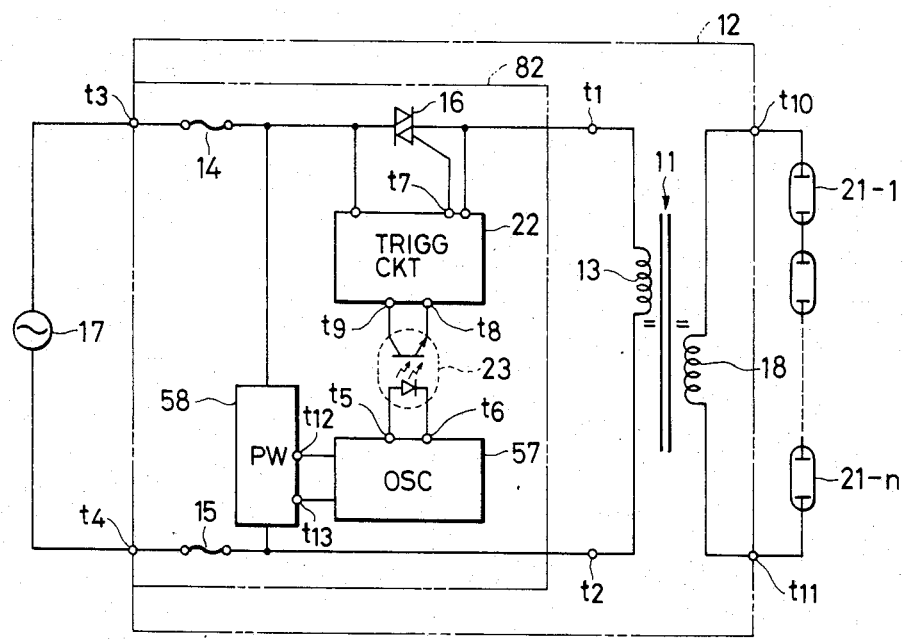
FIG. 8 is a circuit diagram of a neon sign control device of an embodiment of the invention where a control signal generator is installed in a control unit.

The control signal generator 24 may also be installed together with the control unit 28. FIG. 8 shows an example of such arrangement, and parts in FIG. 8 corresponding to those in FIG. 1 are designated by the same reference numerals. An oscillator 57 is installed as the control signal generator 24, and working power for the oscillator 57 is obtained from a.c. power supplied between the terminals $t_3$ and $t_4$. A power source circuit 58 is connected between the terminals $t_3$ and $t_4$ through the fuses 14, 15, to receive the a.c. power and convert it into d.c. power of a prescribed voltage. The d.c. power is supplied through terminals $t_{12}$, $t_{13}$ to power source terminals of the oscillator 57. Oscillation output of the oscillator 57 is supplied as the control signal to the terminals $t_8$, $t_9$ of the trigger circuit 22 through the terminals $t_5$, $t_6$ and also through the photo coupler 23, if necessary.

Figure 9:
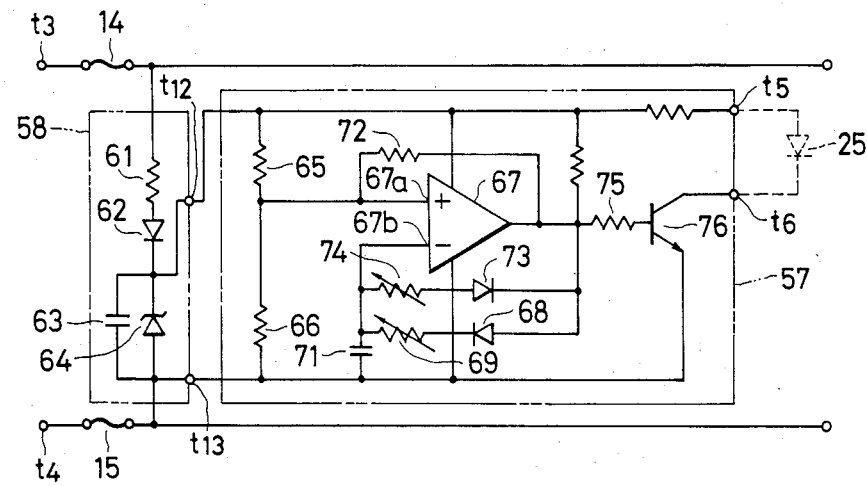
FIG. 9 is a circuit diagram of a specific example of an oscillator 58 as the control signal generator in FIG. 8.

FIG. 9 shows a specific example of the oscillator 57 and the power source circuit 58. When a.c. power between the terminals $t_3$, $t_4$ is supplied to the power source circuit 58 via the fuses 14, 15, the supplied a.c. power is rectified and smoothed by a resistor 61, a diode 62 and a capacitor 63 in the power source circuit 58. The rectified and smoothed power is made to have a constant voltage by a Zener diode 64 connected in parallel to the capacitor 63, and the constant voltage is applied between the terminals $t_{12}$, $t_{13}$.

The constant voltage applied between the terminals $t_{12}$ and $t_{13}$ of the oscillator 57 is divided by resistors 65, 66 and the divided voltage is supplied to a non-inverting input 67a of an operational amplifier 67. Assuming the initial voltage at an inverting input 67b of the operational amplifier 67 is 0 V, then, an output of the operational amplifier 67 becomes high level which is equal to the voltage level at the terminal $t_{12}$, and the capacitor 71 is charged by the high level output through a diode 68 and a variable resistor 69. Since the capacitor 71 is connected to the inverting input 67b, the voltage at the inverting input 67b rises gradually as the capacitor 71 is charged. A resistor 72 is connected between the output and the non-inverting input 67a of the operational amplifier 67. Consequently, the voltage between terminals $t_{12}$ and $t_{13}$ is divided by parallel circuit of the resistors 65 and 72 and the resistor 66, and the divided voltage is supplied to the non-inverting input 67a. When the voltage at the inverting input 67b exceeds the divided voltage, the output of the operational amplifier 67 is inverted into low level which is equal to the voltage level at the terminal $t_{13}$. As a result, the voltage at the non-inverting input 67a falls to the voltage between terminals $t_{12}$ and $t_{13}$ divided by the parallel circuit of the resistors 66, 72 and the resistor 65, and the charge in the capacitor 71 is discharged gradually through a diode 73 and a variable resistor 74 thereby decreasing the voltage at the inverting input 67b gradually. When the voltage at the inverting input 67b becomes lower than the voltage at the non-inverting input 67a, the output of the operational amplifier 67 becomes high level again. Thus, the output of the operational amplifier 67 becomes high level and low level alternately and therefore oscillation is effected.

The output of the operational amplifier 67 is supplied through a resistor 75 to the base of a driving transistor 76 to drive the light emitting diode 25 of the photo-coupler 23 with the control signal current through the terminals $t_5$, $t_6$. That is, when the output of the operational amplifier 67 becomes high level, the transistor 76 is rendered on. As a result, the light emitting diode 25 of the photo coupler 23 and hence the triac 16 in FIG. 8 are rendered on as described in FIG. 1 and FIG. 2. During the conductive state of the triac 16, a high voltage is generated in the secondary winding 18 of the neon transformer 11 and the neon tubes 21-1 to 21-$n$ are turned on.

Next, when the output of the operational amplifier 67 becomes low level, the transistor 76 is rendered off and the light emitting diode 25 of the photo coupler 23 is put out, and the triac 16 in FIG. 8 is also rendered off. Consequently, the neon tubes 21-1 to 21-$n$ are turned off. In this manner, the neon tubes 21-1 to 21-$n$ are controlled on and off alternately by the output of the oscillator 57.

Figure 10:
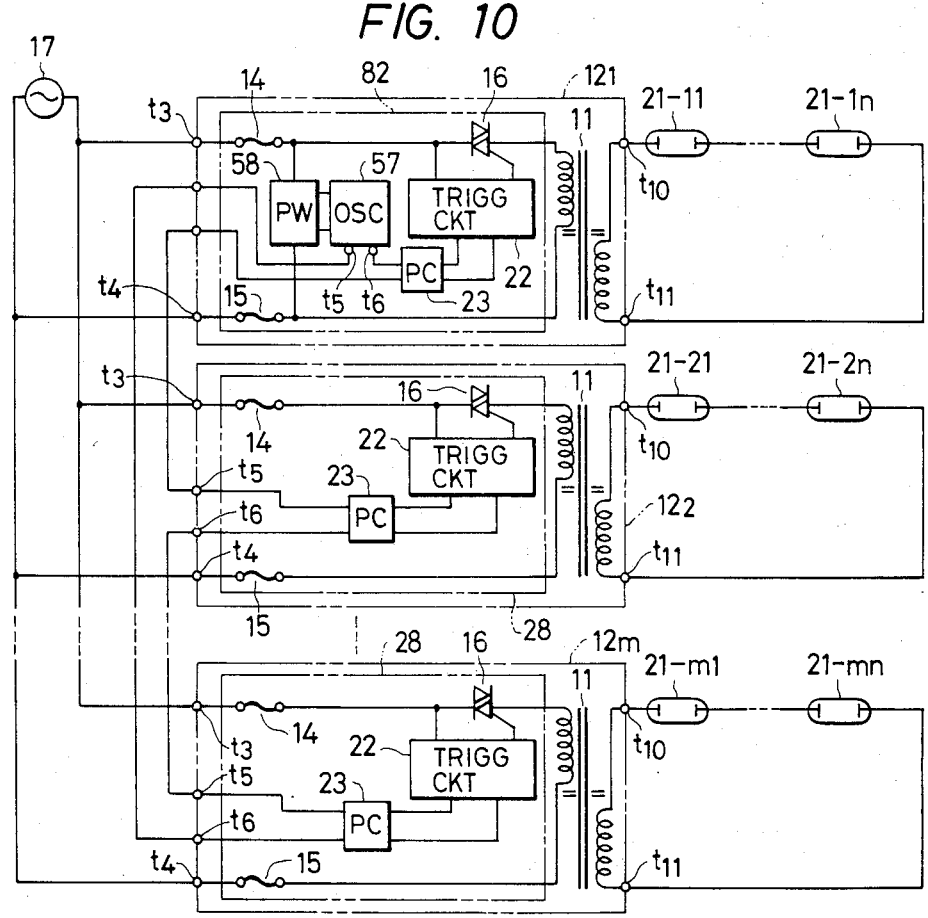
FIG. 10 is a block diagram illustrating an example of the combination of the neon transformer having the control unit shown in FIG. 1 and the embodiment shown in FIG. 8.

In the case where a plurality of groups of neon tubes allocated to a plurality of neon transformers are simultaneously controlled to perform on/off operation, it is possible to arrange them as shown in FIG. 10 utilizing the arrangement shown in FIG. 8. Parts in FIG. 10 corresponding to those in FIG. 4 are designated by the same reference numerals, but the arrangement in the neon transformer housing $12_1$ is identical with that shown in FIG. 8. The arrangements in the other neon transformer housings $12_2$ to $12_m$ are also similar to the arrangement of FIG. 8 excluding the oscillator 57 and the power source circuit 58, i.e. similar to the arrangement shown in FIG. 1. Photo couplers 23 in the respective housings $12_1$-$12_m$ are all connected in series at the input side (i.e. the terminals $t_5$, $t_6$ for the light emitting diodes 25), and the output of the oscillator 57 in the housing $12_1$ is supplied to the series connection. The neon tubes 21-11 ... 21-1$n$ to 21-$m$1 ... 21-$mn$ are thus turned on and off simultaneously by the output of the oscillator 57.

Figure 11:
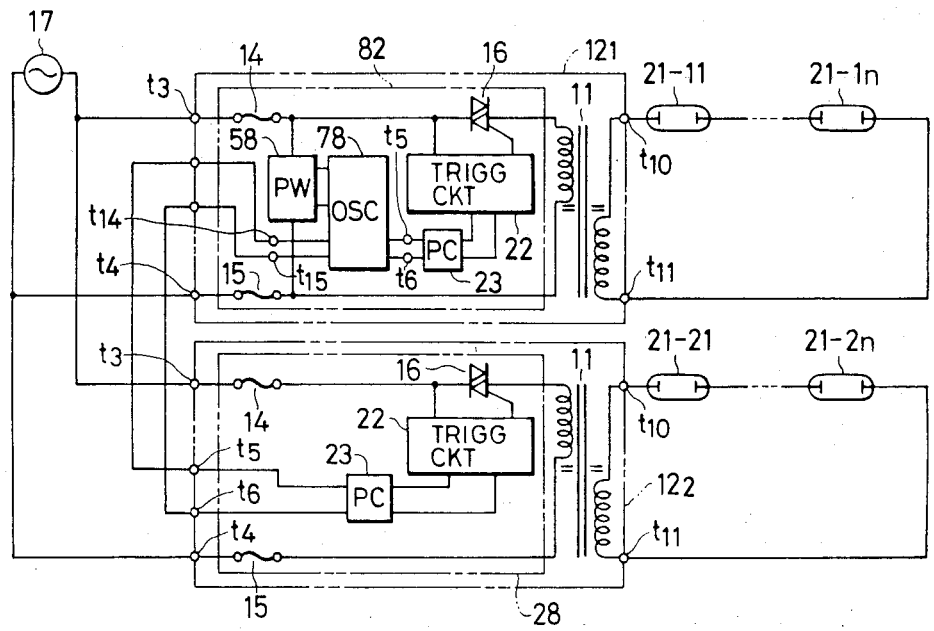
FIG. 11 is a block diagram illustrating an example of alternate driving of two neon transformers.
Figure 12:
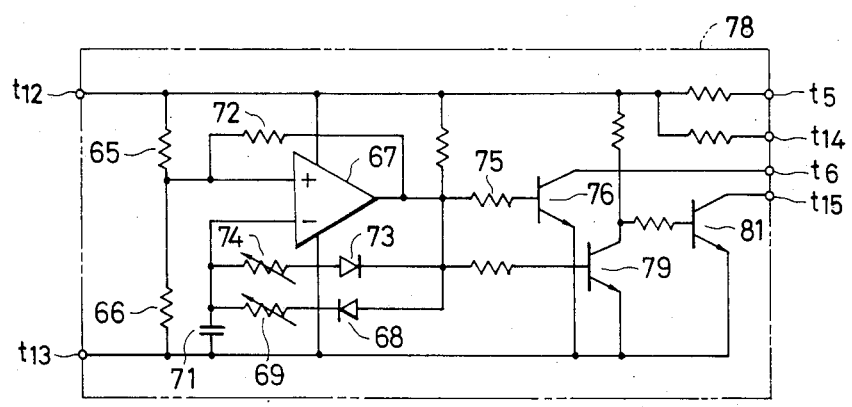
FIG. 12 is a circuit diagram illustrating an example of the oscillator 78 in FIG. 11.

FIG. 11 shows still another embodiment of the invention, and the neon tubes 21-11 ... 21-1$n$ and the neon tubes 21-21 ... 21-2$n$ are alternately turned on and off. The arrangement in the transformer housing $12_1$ is similar to that shown in FIG. 8, but the oscillator 57 is replaced by an oscillator 78 which can generate two outputs in reverse polarity (i.e. reverse phase) to each other. The arrangement in the transformer housing $12_2$ is the same as that shown in FIG. 1. The oscillator 78 may be arranged as shown in FIG. 12 in which the parts corresponding to those in FIG. 9 are designated by the same reference numerals. In FIG. 12, the output of an operational amplifier 67 is supplied through an inverting transistor 79 to a driving transistor 81. The output i.e. the collector of the transistor 81 is connected via a terminal $t_{15}$ to the light emitting diode of the photo coupler 23 in the housing $12_2$, which diode is in turn connected to terminal $t_{14}$. Thus, oscillation output between the terminals $t_{14}$ and $t_{15}$ is supplied to terminals $t_5$, $t_6$ of the transformer housing $12_2$ as shown in FIG. 11. When the neon tubes 21-11 . . . 21-1$n$ are on, the neon tubes 21-21 . . . 21-2$n$ are off; when the neon tubes 21-11 . . . 21-1$n$ are off, the neon tubes 21-21 . . . 21-2$n$ are on.

Also in FIG. 11, the arrangement shown in FIG. 10 may be adopted so that photo couplers 23 belonging to one group of the transformer housings are connected in series at the input side and supplied with oscillation output between the terminals $t_5$ and $t_6$ of the oscillator 78, and photo couplers 23 belonging to another group of the transformer housings are also connected in series at the input side and supplied with the output between the terminals $t_{14}$ and $t_{15}$ of the oscillator 78.

The control unit 82 between the terminals $t_3$, $t_4$ and the terminals $t_1$, $t_2$, including the oscillator 57 or 78, as shown in FIGS. 8, 10 or FIG. 11, may also be installed either inside or outside of the housing 12 in a manner similar to the control unit 28 depicted in FIG. 1.

Modification of the control unit will now be described referring to FIG. 13. The control unit 83 is provided with an electronic switching element 16, a trigger circuit 22 and a photo coupler 23 in a similar manner to FIG. 1, and a power source circuit 58 in a similar manner to FIG. 8, and is also provided with a timer circuit 84 and a further photo coupler 85. The photo couplers 23 and 85 are connected in series at their input side, and the two ends of the series connection are connected to the terminals $t_5$, $t_6$. The output side of the photo coupler 85 is connected to the input side of the timer circuit 84, and the output side of the timer circuit 84 is connected to terminals $t_{16}$, $t_{17}$. Output terminals $t_{12}$, $t_{13}$ of the power source circuit 58 are connected to power source terminals of the timer circuit 84. When the photo couplers 23, 85 are omitted, the trigger circuit 22 and the timer circuit 84 are connected in series at their input side and connected to the terminals $t_5$, $t_6$.

The timer circuit 84 is triggered at the rear end of the control signal to the trigger circuit 22. In the example, when the photo transistor $85_T$ of the photo coupler 85 is rendered off, the timer circuit 84 is triggered and an output is produced during a preset time period starting with the triggering. An arrangement of the timer circuit 84 is shown in FIG. 14. The collector of a photo transistor $85_T$ of the photo coupler 85 is connected through a resistor 86 to the power source terminal $t_{12}$ and also via a capacitor 87 to a trigger terminal 2 of a timer element 88. For example, an integrated circuit μPC1555 of Nippon Electric Co., Ltd. is used as the timer element 88. A light emitting diode $85_D$ of the photo coupler 85 is connected in series with the light emitting diode 25 of the photo coupler 23 (FIG. 13). When the output control signal of the control signal generator 24 becomes low level, both the light emitting diodes 25, $85_D$ are turned off. Consequently, the neon tubes 21-1 . . . 21-$n$ are also turned off. At the same time, the photo transistor $85_T$ is rendered off and a negative pulse is supplied as a trigger to the trigger terminal 2 of the timer element 88. In response to the trigger, high level is produced from an output terminal 3 of the timer element 88 and charging of a capacitor 91 from the power source terminal $t_{12}$ through a resistor 89 is started. When the potential of the capacitor 91 reaches a prescribed value, a threshold terminal 6 is turned on and the output at the output terminal 3 is inverted into low level. Then the charge in the capacitor 91 is discharged through discharge terminals 1, 7. If a trigger is supplied to the trigger terminal 2 again, a similar process is repeated. The output at the output terminal 3 of the timer element 88 is supplied to the base of a transistor 92, and if high level is supplied thereto the transistor 92 is rendered on. Terminal $t_{16}$ connected to the power source terminal $t_{12}$ through a resistor 93 and terminal $t_{17}$ connected to the collector of the transistor 92 define output terminals of the timer circuit 84.

Figure 13:
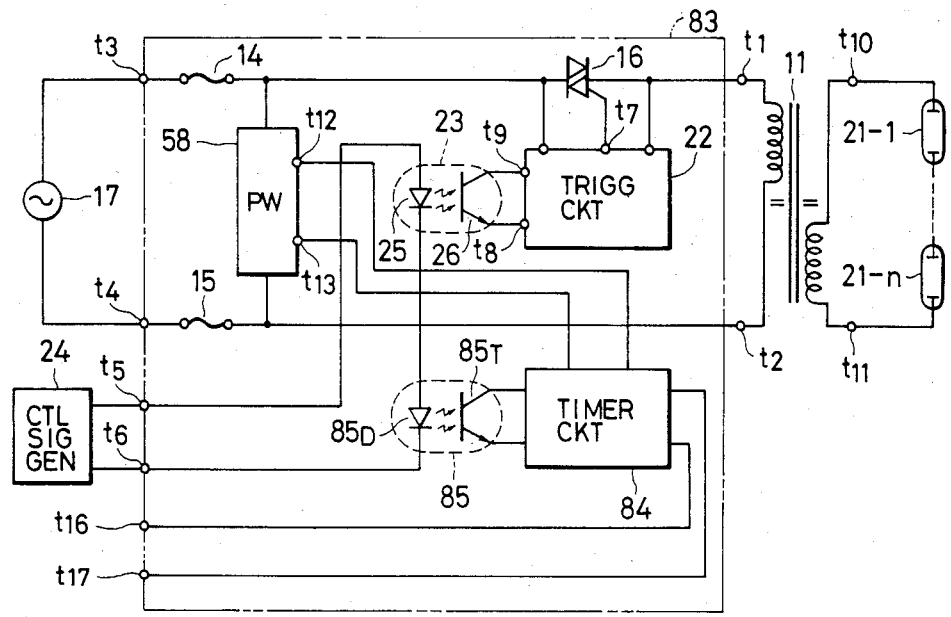
FIG. 13 is a block diagram of a neon sign control device of the invention having a control unit with a timer circuit.
Figure 14:
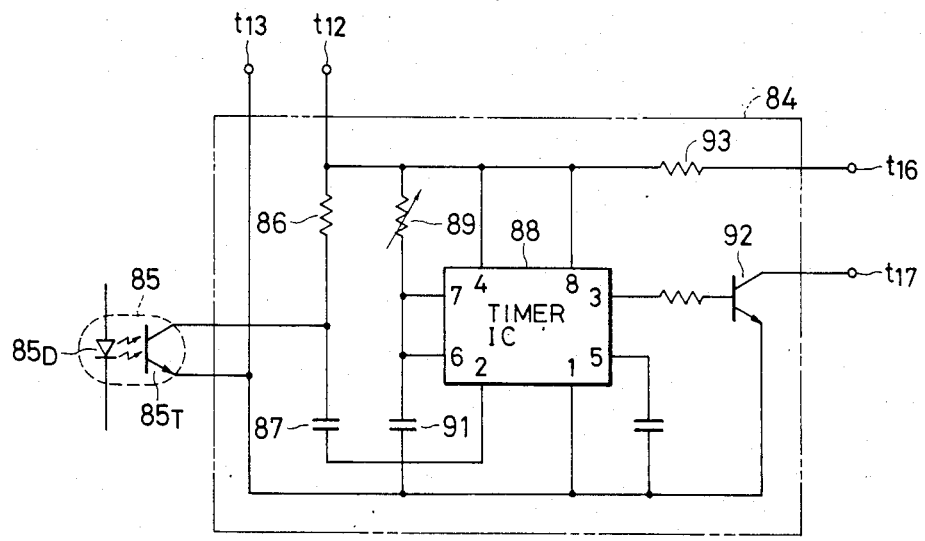
FIG. 14 is a circuit diagram illustrating a specific example of the timer circuit 84 in FIG. 13.
Figure 15:
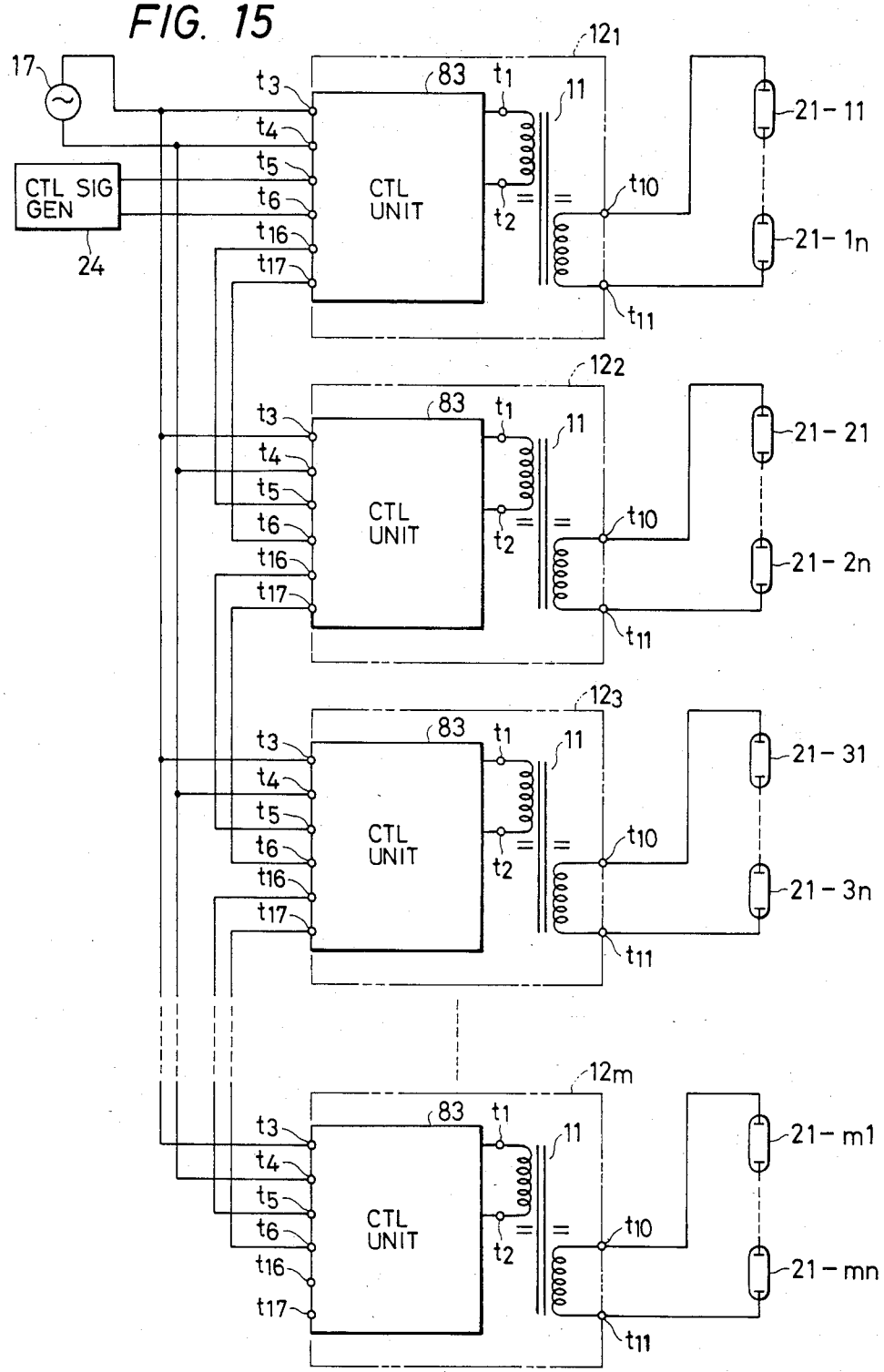
FIG. 15 is a block diagram of a plurality of transformer housings having control units as shown in FIG. 13 where the control units are connected in cascade.

A plurality of the control units 83 each shown in FIG. 13, may be respectively installed in or on a plurality of neon transformer housings and connected in cascade so that neon tubes are turned on and off in sequence. Referring to FIG. 15, for example, the a.c. power source 17 is connected between the terminals $t_3$ and $t_4$ of each of the transformer housings $12_1$–$12_m$ in parallel thereto, and the control signal generator 24 is connected to the terminals $t_5$, $t_6$ of the transformer housing $12_1$ only. The terminals $t_{16}$, $t_{17}$ of the transformer housing $12_1$ are connected to the terminals $t_5$, $t_6$ of the succeeding transformer housing $12_2$ respectively, the terminals $t_{16}$, $t_{17}$ of the transformer housing $12_2$ are in turn connected to the terminals $t_5$, $t_6$ of the next transformer housing $12_3$, respectively, and similar connection is made in sequence so that the terminals $t_{16}$, $t_{17}$ of each transformer housing are connected to the terminals $t_5$, $t_6$ of the succeeding transformer housing.

The control signal generator 24 outputs for example, an on/off control signal with a duty cycle 50% as shown in FIG. 16A. Time of the timer circuit 84 in each control unit 83 is preset so that the length of an ON interval of the control signal becomes $T_1$. During the interval of the initial control signal $19_1$, the neon tubes 21-11 . . . 21-1$n$ of the housing $12_1$ are lit as shown in FIG. 16B. As shown in FIG. 14, the timer circuit 84 in the housing $12_1$ is triggered at the rear end of the control signal $19_1$ and the transistor 92 (FIG. 14) is rendered on, thereby allowing current to flow through the diode 25 of photo coupler 23 via the terminals $t_5$, $t_6$ of the following housing $12_2$. The neon tubes 21-21 to 21-2$n$ of the housing $12_2$ are lit during the time period set by the timer circuit 84 of the housing $12_1$ as shown in FIG. 16C. When the lighting of the neon tubes 21-21 to 21-2$n$ is ended, the timer circuit 84 in the housing $12_2$ is triggered, and during the timer interval the neon tubes 21-31 . . . 21-3$n$ of the succeeding housing $12_3$ are lit as shown in FIG. 16D. In a similar manner, neon tubes corresponding to the housing $12_4$ (not shown) . . . the housing $12_m$ are lit in sequence. Also, by the next control signal $19_2$, the neon tubes 21-11 to 21-1$n$, through 21-$m$1 to 21-$mn$ corresponding to the housings $12_1$ to $12_m$ are successively lit for one housing at a time. Thus, so-called traveling light spot action (it need not necessarily be a spot, and may be a line or area) can be performed.

The neon tubes can be turned on and off in various switching modes by selecting the frequency and duty cycle of the control signal of the control signal generator 24 and the timer interval of the timer circuit 84. In order to perform so-called traveling light spot action of 2/1 ON-OFF ratio, control signal is set so that the ON-interval $T_1$ is twice the OFF-interval $T_2(T_1=2T_2)$ as shown in FIG. 17A, and the timer interval of each timer circuit 84 is made equal to OFF-interval $T_2$. In such an arrangement, the neon tubes 21-11 to 21-1n 21-21 to 21-2n, 21-31 to 21-3n corresponding to the housings 12$_1$, 12$_2$, 12$_3$ are lit in sequence as shown in FIG. 17B, FIG. 17C, FIG. 17D, respectively, with the ON and OFF intervals being $T_1$ and $T_2$.

The control signal generator 24 may be enclosed within the housing 12$_1$ as described regarding FIG. 10. Timer interval in the timer circuit 84 is set by varying the time constant of the resistor 89 and the capacitor 91 in FIG. 14. Therefore the resistor 89 is a variable resistor. The control unit 83 may be installed inside or outside of the housing 12.

Figure 18:
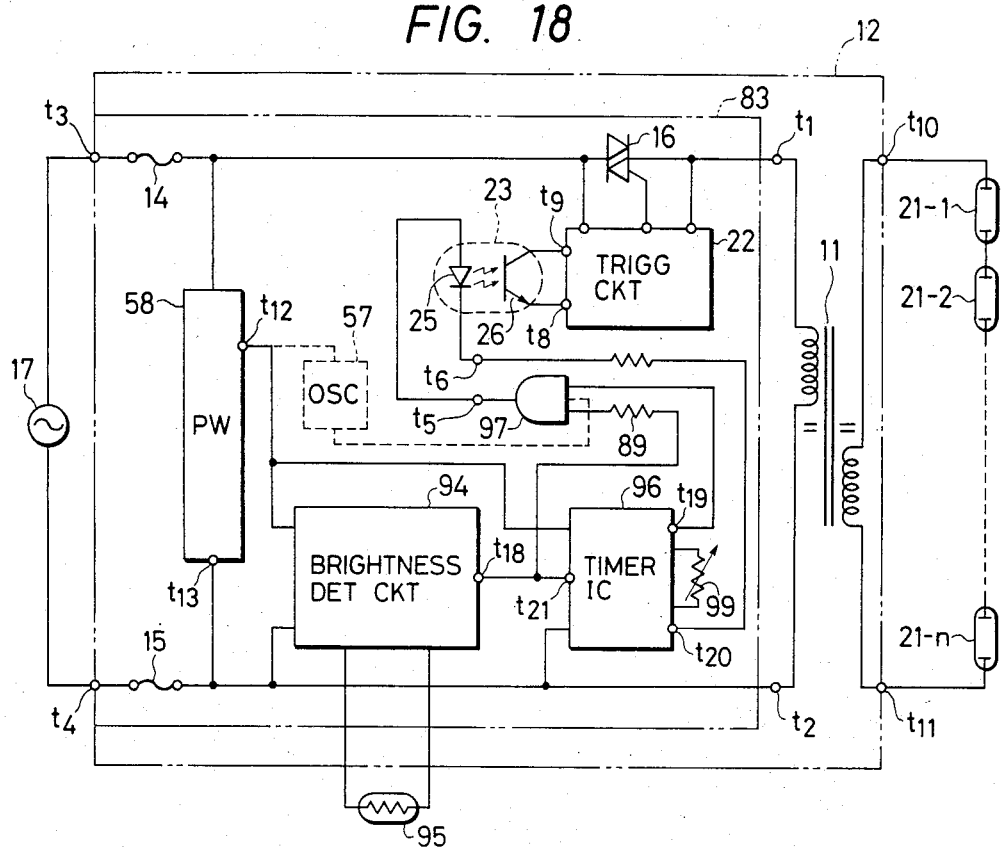
FIG. 18 is a block diagram of a neon sign control device as another embodiment of the invention where neon tubes are turned on and off by full automatic control.

According to the invention as described above, the control unit 28 is installed between the d.c. power source 17 and the neon transformer 11, and on/off control of the electronic switching element 16 is performed so as to control lighting of the neon tubes. Consequently, this arrangement can be easily modified so that the neon tubes are automatically lit only during a predetermined time from the evening to the night. FIG. 18 shows an example of such an arrangement, where parts in FIG. 18 corresponding to those in FIGS. 1 and 8 are designated by the same reference numerals. In the example, a brightness detecting circuit 94 is provided to detect whether the brightness of outdoors becomes lower than a prescribed value. The brightness detecting circuit 94 is provided with a photo-electric converting element 95 having electric characteristics varying corresponding to brightness, such as a photoconductive CdS element 95. A timer circuit 96 is started in response to a detection signal of the brightness detecting circuit 94. In accordance with the output state of the timer circuit 96, a gate circuit 97 passes the detection signal from the brightness detecting circuit 94 to the trigger circuit 22 via the photo coupler 23 or interrupts it. For example, an output terminal t$_{18}$ of the brightness detecting circuit 94 is connected through a resistor 89 to one input of an AND circuit 97, and the other input of the AND circuit 97 is connected to an output terminal t$_{19}$ of the timer circuit 96. The output side of the AND circuit 97 is connected through the light emitting diode 25 of the photo coupler 23 to a terminal t$_{20}$ of the timer circuit 96. Working power is supplied to the brightness detecting circuit 94 and the timer circuit 96 from the terminals t$_{12}$, t$_{13}$ of the power source circuit 58. A variable resistor 99 is connected to the timer circuit 96 for adjusting the timer duration.

The photo-electric converting element, CdS element 95 in the example, is installed outside. As the surrounding field gradually becomes dark in the evening, the resistance value of the CdS element 95 increases. When it becomes dark outdoors, and therefore the resistance value of the CdS element 95 exceeds a prescribed value, this is detected by the brightness detecting circuit 94 and the output terminal t$_{18}$ of the brightness detecting circuit 94 becomes high level. The high level is supplied to a reset terminal t$_{21}$ of the timer circuit 96 to release the reset state of the timer circuit 96, starting the timer. The timer circuit 96 is one that produces a high level at the output terminal t$_{19}$ of the timer circuit 96 after the start of timer operation until time is up and then produces low level.

A logical AND operation between the detection signal from the brightness detecting circuit 94 and the output from the terminal t$_{19}$ of the timer circuit is performed at the AND circuit 97, and the output of the AND circuit 97 becomes high level and is supplied as a control signal to the light emitting diode 25 of the photo coupler 23 to turn on the light emitting diode 25 and the triac 16 as described above, thereby turning on the neon tubes 21-1 to 21-n.

Setting time of the timer circuit 96 is set to a time interval which extends from the lighting of the neon tubes 21-1 to 21-n in the evening to, for example, midnight. When the setting time lapses after the starting of the timer circuit 96, the output at the terminal t$_{19}$ of the timer circuit 96 is inverted to low level to inhibit the control signal from passing through the gate circuit 97, thereby turning off the light emitting diode 25 of the photo coupler 23, the triac 16 and hence the neon tubes 21-1 to 21-n. As the surrounding field becomes light again in the morning, the resistance value of the CdS element 95 gradually decreases. When the resistance value becomes lower than the prescribed value, the output at the terminal t$_{18}$ of the brightness detecting circuit 94 becomes low level. The low level is supplied to the reset terminal t$_{21}$ of the timer circuit 96 so that the timer circuit 96 is reset and the process is returned to the initial state. The above-mentioned operation is effected one round every day, and the on/off operation of the neon tubes 21-1 to 21-n can be securely controlled. It can be said that the brightness detecting circuit 94, the timer circuit 96 and the gate circuit 47 constitute the control signal generator 24.

Figure 19:
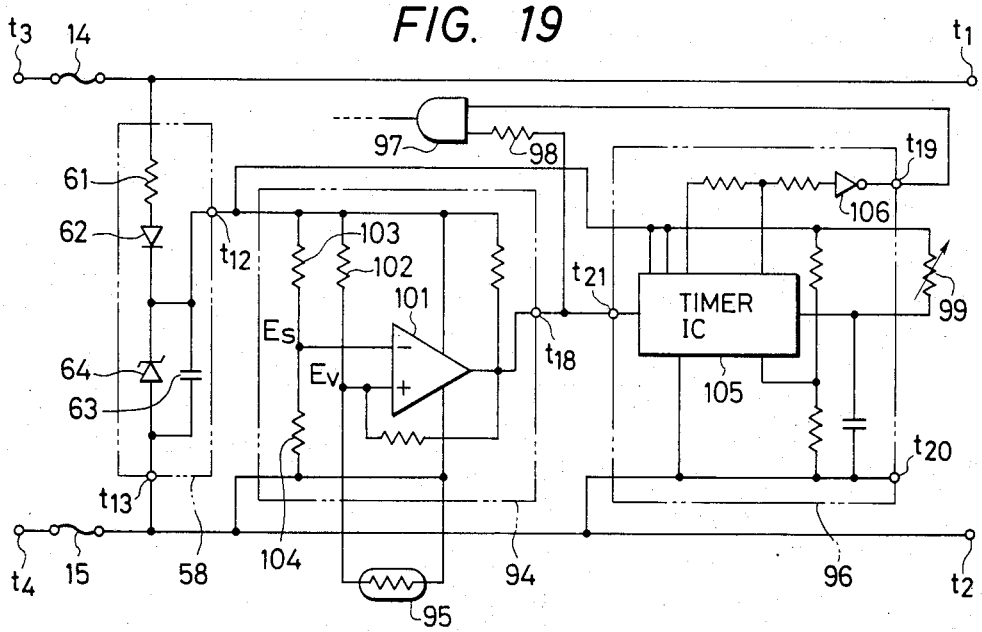
FIG. 19 is a circuit diagram illustrating a specific example of the brightness detecting circuit 94 and the timer circuit 96 in FIG. 18.

FIG. 19 shows a specific example of the power source circuit 58, the brightness detecting circuit 94 and the timer circuit 96 in FIG. 18. The power source circuit 58 is the same as that in FIG. 9, parts corresponding to those in FIG. 9 are designated by the same reference numerals, and a repeated description of these elements shall be omitted. A voltage comparator 101 is used in the brightness detecting circuit 94, and a voltage $E_v$ obtained by dividing the voltage between the terminals t$_{12}$ and t$_{13}$ by a resistor 102 and the CdS element 95, and a voltage $E_s$ obtained by dividing the voltage between the terminals t$_{12}$ and t$_{13}$ by resistors 103, 104 are compared by the voltage comparator 101. When the surrounding field becomes dark and the resistance value of the CdS element 95 increases and $E_v$ becomes larger than $E_s$, the output of the comparator 101 becomes high level and the dark outdoor condition is detected. Consequently, the reset state of the timer circuit 96 is released and the timer operation is started. The timer circuit 96 may be constructed by utilizing a long-time timer IC element 105 of linear ICM51845L made by Mitsubishi Electric Corporation.

Upon start of operation of the long-time timer IC element 105, low level is produced from the element 105, which is inverted by an inverter 106 to produce high level at the terminal t$_{19}$. Consequently, the trigger circuit 22 is driven through the AND circuit 97 and the triac 16 is rendered on as described before. When the timer interval lapses after the triac 16 becomes conductive, the IC element 105 outputs high level and the terminal t$_{19}$ becomes low level to stop activation of the trigger circuit 22. When the surrounding field becomes light in the morning and the resistance value of the CdS element 95 becomes lower than the prescribed value, the output of the voltage comparator 101 becomes low level and the timer IC element 105 is reset.

In the arrangement of FIG. 18, in order to turn on and off the neon tubes 21-1 to 21-n, the oscillator 57 described in respect to FIG. 8 may be incorporated as shown by broken line in FIG. 18 and the output of the oscillator 57 may be supplied to another input of the gate circuit 97 so that the three inputs to the gate circuit 97 are ANDed. In this arrangement, the output of the oscillator 57 is supplied to the gate circuit 97 in such a manner that the output of the operational amplifier 67 in FIG. 9 is used as the output of the oscillator 57 and supplied directly to the gate circuit 97 without passing through the transistor 76.

Figure 20:
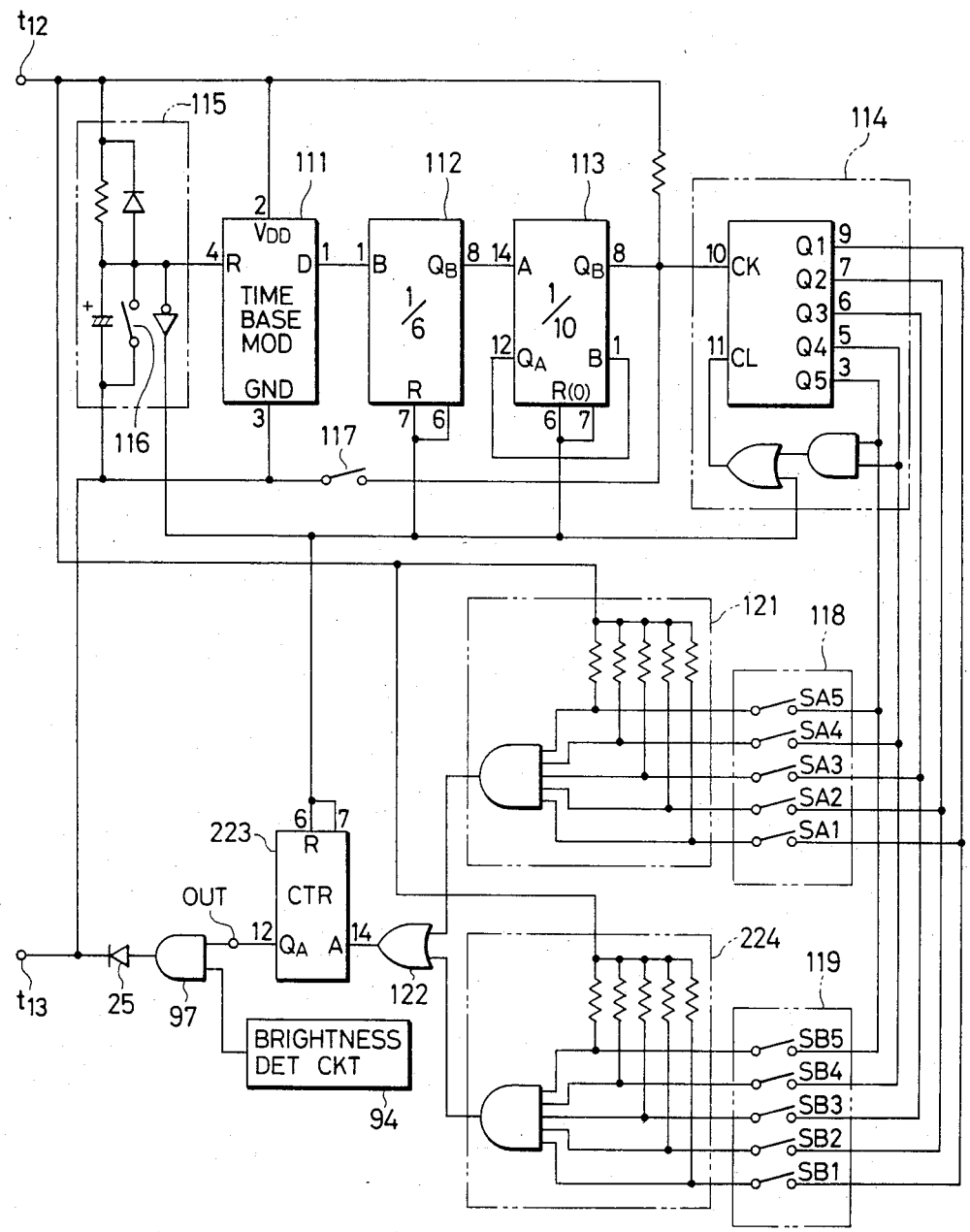
FIG. 20 is a circuit diagram illustrating a specific example of a clock circuit (timer circuit of 24 hours) to be used in place of the timer circuit 96 in FIG. 18.

In the arrangement of FIG. 18, the timer 96 may be replaced by a clock circuit (timer circuit of 24 hours). FIG. 20 shows a specific example of the clock circuit to be employed in this case. A fundamental clock with a period of one minute from a time base module 111 is divided by a frequency divider 112 into 1/6 of the fundamental clock frequency, and the divided output is further divided by a frequency divider 113 into 1/10 of the output frequency of the divider 112. The output with a period of one hour from the frequency divider 113 is counted by a mod-24 counter 114. A reset switch 116 of a reset circuit 115 is controlled to reset the time base module 111 and the frequency dividers 112, 113, and clear the mod-24 counter 114. In this state, a time matching switch 117 is controlled to step the counter 114 to thereby adjust the content of the counter 114 to the clock time. Although not shown, the content of the counter 114 is indicated on a display in decimal notation, and viewing the display, the clock time is adjusted. Thereafter, the reset switch 116 is set to a normal state. As a result, the counted value of the mod-24 counter represents the current clock time.

A clock setting switch 118 sets a starting time of the interval during which neon signs are lit in the evening, and a clock setting switch 119 sets an end time of lighting at night. When the content of the mod-24 counter 114 coincides with the setting value of the clock setting switch 118, the coincidence is detected by a coincidence detecting circuit 121 and the detection output advances a binary counter (or ½-frequency divider) 223 by one step through an OR circuit 122, whereby the output of the binary counter 223 becomes high level and the high level output is supplied to the gate circuit 97 in FIG. 18. The binary counter 223 is reset beforehand by output of the reset circuit 115 when the clock time adjustment is conducted. When the content of the mod-24 counter 114 coincides with the setting value of the clock setting switch 119, the coincidence is detected by a coincidence detecting circuit 224 and the detection output advances the binary counter 223 by one step through the OR circuit 122, whereby the output of the binary counter 223 becomes low level. Consequently, when the output of the binary counter 223 is at high level in the evening, if the brightness detecting circuit 94 (FIG. 18) detects a dark state of the outdoor field, an output is obtained from the gate circuit 97 and the neon tubes are turned on. If the output of the binary counter 223 becomes low level at night, the neon tubes are put out. In this arrangement, even if it becomes dark outdoors in the daytime, the output of the brightness detecting circuit 94 is inhibited by the gate circuit 97 and the neon signs are not lit.

A neon sign control device of the type described in the foregoing has following effects:

Since a control unit for controlling energization of the primary winding circuit of each neon transformer can be installed near the neon transformer, wiring of a long power line as used in a conventional device is not necessary. Wiring of the power line is effected only by parallel connection to all neon transformers and the construction is significantly simplified. The control signal from the control signal generator may be weak signal (i.e. a low voltage signal), and wiring between the control unit and the control signal generator 24 can be performed using a signal wire of a small diameter. Consequently, the installation cost for the wiring can be reduced and the wiring work is simplified.

Since a semiconductor element is used in the control unit in place of the conventional mechanical contacts, dangerous faults such as abnormal heating can be prevented. Durability can be improved and maintenance of the device and the control process number can be reduced.

Since the control signal from the control signal generator 24 may be a weak signal, the control signal generator 24 can be formed as an electronic arrangement. Consequently, both the power consumption and size can be reduced.

The control signal generator 24 may be constituted using a computer for generating the control signal, whereby complicated lighting control of neon tubes can be easily performed even though it is difficult in the prior art. In this case, if memory for storing a lighting program for generating control signal is provided as a cassette, the lighting program can be easily altered.

Since the control unit is formed as a semiconductor circuit, the conduction time of the electronic switching element can be easily controlled and this control also enables the brightness control of neon tubes.

If the control unit is constituted by a zero-cross switch circuit shown in FIG. 3, generation of noise during controlled operation can be reduced.

Since an optical fiber may be used in the transmission line of the control signal from the control signal generator, stable control is possible without being affected by external noises.

If the control signal generator 24 is installed within the control unit using oscillators 38, 78 as described in FIG. 8 or FIG. 11, the transmission line 27 for the control signal may be omitted. In this case, the control signal from a control signal generator (or oscillator) installed in a control unit of one of a plurality of neon transformers can be supplied to a control unit of another neon transformer, whereby neon tubes of all neon transformers can be controlled in a simple manner.

Further, a timer circuit 84 may be provided within the control unit as shown in FIG. 13 and the control unit 83 may be installed at each neon transformer housing 12 and connected in cascade as shown in FIG. 15, whereby traveling light spot action can be easily performed. Switching control of turning on and off in various fashions can be effected with a simple arrangement by selecting the timer interval of the timer circuit 84 and the frequency and duty cycle of the control signal.

The brightness detecting circuit and the timer circuit or clock circuit may be installed within the control unit as shown in FIG. 18, whereby the starting and the ending of continuous lighting or switching control of neon tubes can be effected in full automatic operation without necessitating manual operation.

What is claimed is:

1. A neon sign control device for controlling the ON and OFF condition of neon tubes connected across a secondary winding of a neon transformer in a transformer housing disposed near said neon tubes, A.C. power being supplied from an A.C. power source to a primary winding of said neon transformer through a pair of power lines, said control device comprising:
- a control unit including a bidirectional semiconductor switching element having a pair of power terminals and a gate terminanl, said switching element being rendered ON when a trigger signal is supplied to said gate terminal, and a trigger circuit connected between said gate terminal and one of said pair of power terminals of said bidirectional semiconductor switching element for generating and supplying, in response to a control signal provided to an input terminal of said trigger circuit, the trigger signal to said gate terminal of said bidirectional semiconductor switching element;
- a control signal generator for generating said control signal and supplying it to said trigger circuit of said control unit through a control signal transmission line; and
- a connector box having installed therein said control unit, said connector box being detachably mounted on said transformer housing, said pair of power lines being led into said connector box, one of said power lines being connected to one of said power terminals of said bidirectional semiconductor switching element, and the other of said power terminals and the other of said power lines being detachably connected with terminals of said primary winding through connector means.

2. A neon sign control device according to claim 1 wherein said control device comprises plural sets of said control units in said connector boxes and plural neon transformers in said transformer housings, respective pairs of said power lines led out of said connector boxes being connected in parallel with said A.C. power source, said control signal generator supplying individual control signals to respective ones of said trigger circuits of said control units through individual ones of said control signal transmission lines.

3. A neon sign control device according to claim 1 wherein said control device comprises plural sets of said control units in said connector boxes and plural neon transformers in said transformer housings, respective pairs of said power lines led out of said connector boxes being connected in parallel with said A.C. power source, each of said control transmission lines comprising a pair of conductor wires, said trigger circuits being connected in series with one another through respective pairs of said conductor wires, and said control signal generator applying an electric control signal across the ends of the series connection of said trigger circuits.

4. A neon sign control device according to claim 1 wherein said trigger circuit comprises:
- a bridge rectifier means having a pair of A.C. input terminals connected between said gate terminal and one of said power terminals of said bidirectional semiconductor switching element and also having a pair of D.C. output terminals;
- a unidirectional semiconductor switch connected between said D.C. output terminals and having a control gate; and
- a transistor switching circuit connected across said unidirectional semiconductor switch in parallel thereto, said transistor switching circuit including a series connection of a resistor and a switching transistor, the junction between said resistor and transistor being connected to said control gate of said unidirectional semiconductor switch so that, upon receipt of the control signal at the base of said switching transistor, said unidirectional semiconductor switch generates the trigger signal.

5. A neon sign control device according to claim 3 wherein said control signal generator is an oscillator provided as a part of said control unit in one of said connector boxes, said control unit also including a power source circuit connected to said power lines for producing D.C. power to be supplied to said oscillator.

6. A neon sign control device according to one of claims 2 or 3 wherein said control signal generator is disposed apart from said transformer housings and connected with respective ones of said control units through said control signal transmission lines led out of said connector boxes.

7. A neon sign control device according to one of claims 2 or 3 wherein each of said connector boxes includes a photo coupler for coupling the control signal between the input terminal of said trigger circuit and said control signal transmission line while maintaining DC isolation therebetween.

8. A neon sign control device according to one of claims 1, 2 or 3 wherein said control signal generator comprises a brightness detecting circuit for detecting a brightness below a preset level and generating a detection output when it becomes dark outside, an operation timer started by said detection output and generating an operating signal for a preset time, and a gate circuit for receiving the detection output of said brightness detecting circuit and the operating signal from said operation timer and operative to produce a logical product thereof as said control signal.

9. A neon sign control device according to one of claims 1, 2 or 3 wherein said control signal generator comprises a brightness detecting circuit for detecting a brightness below a preset level and generating a detection output when it becomes dark outside, a clock circuit for generating an operating signal each day during two clock times preset therein, and a gate circuit for receiving the detection output from said brightness detecting circuit and the operating signal from said clock circuit and producing a logical product thereof as said control signal.

10. A neon sign control device for controlling the ON and OFF condition of neon tubes connected to the secondary windings of plural neon transformers in respective transformer housings disposed near said neon tubes, A.C. power being supplied from an A.C. power source to primary windings of respective ones of said neon transformers through a pair of power lines, said control device comprising:
- a plurality of control units each of which includes a bidirectional semiconductor switching element having a pair of power terminals and a gate terminal, said switching element being rendered ON when a trigger signal is supplied to said gate terminal, and a trigger circuit connected between said gate termainal and one of said power terminals of said bidirectional semiconductor switching element for generating and supplying, in response to a control signal provided to an input terminal of said trigger circuit, the trigger signal to said gate terminal;
- a control signal generator for generating and supplying a control signal to said trigger circuits of respective ones of said control control units through control signal transmission lines;

connector boxes having installed therein respective ones of said control units, said connector boxes being detachably mounted on respective ones of said transformer housings;

said pair of power lines being led into each of said connector boxes, one of said power lines being connected to one of said power terminals of said bidirectional semiconductor switching element, and the other of said power terminals and the other of said power lines being detachably connected to terminals of the respective one of said primary windings;

said control signal generator comprising an oscillator in one of said control units which is powered by a D.C. power source provided therein and connected between said power lines, all of said trigger circuits in said control units being connected in series to said oscillator through said control signal transmission lines.

11. A neon sign control device according to claim 10 wherein said one of control units further comprises a brightness detecting circuit for detecting brightness below a preset level and for generating a detection output when it becomes dark outside, an operation timer started by said detection output for generating an operating signal for a preset time, and a gate circuit for receiving as inputs the detection output from said brightness detecting circuit, the operating signal from said operation timer, and an oscillation output from said oscillator, said gate circuit producing a logical product of said inputs as said control signal.

12. A neon sign control device for controlling the ON and OFF condition of neon tubes connected to the secondary windings of two neon transformers in respective transformer housings disposed near said neon tubes, A.C. power being supplied from an A.C. power source to primary windings of respective ones of said neon transformers through a pair of power lines, said control device comprising:

two control units each of which includes a bidirectional semiconductor switching element having a pair of power terminals and a gate terminal, said switching element being rendered ON when a trigger signal is supplied to said gate terminal, and a trigger circuit connected between said gate terminal and one of said power terminals of said bidirectional semiconductor switching element for generating and supplying, in response to a control signal provided to an input terminal of said trigger circuit, the trigger signal to said gate terminal;

a control signal generator for generating and supplying first and second control signals to said trigger circuits of respective ones of said control units through control signal transmission lines;

two connector boxes having installed therein respective ones of said control units, said connector boxes being detachably mounted on respective ones of said transformer housings;

said pair of power lines being led into each of said connector boxes, one of said power lines being connected to one of said power terminals of said bidirectional semiconductor switching element, and the other of said power terminals and the other of said power lines being detachably connected to the terminals of corresponding ones of said primary windings;

one of said control units including said control signal generator, said control signal generator comprising an oscillator and a power source circuit connected between said pair of power lines for converting said A.C. power to D.C. power and for supplying the D.C. power to said oscillator, said oscillator being operative to generate and supply first and second control signals, which are 180° out of phase from each other, to said trigger circuits of said two control units through said control signal transmission lines respectively.

13. A neon sign control device according to claim 12 wherein said one of control units comprises a brightness detecting circuit for detecting brightness below a preset level and for generating a detection output when it becomes dark outside, an operation timer started by the detection output and generating an operating signal for a preset time, and a gate circuit for receiving as inputs the detection output from said brightness detecting circuit, the operating signal from said operation timer, and an oscillation output from said oscillator, said gate circuit producing a logical product of said inputs as said control signal.

14. A neon sign control device according to claim 12 wherein said one of control units comprises a brightness detecting circuit for detecting brightness below a preset level and for generating a detection output when it becomes dark outside, a clock circuit for generating an operating signa during two clock times that are preset therein for each day, and a gate circuit for receiving as inputs the detection output from said brightness detecting circuit, the operating signal from said clock circuit, and an oscillation output from said oscillator, said gate circuit producing a logical product of said inputs as said control signal.

15. A neon sign control device for controlling the ON and OFF condition of neon tubes connected across a secondary winding of a neon transformer in a transformer housing disposed near said neon tubes, A.C. power being supplied from an A.C. power source to a primary winding of said neon transformer through a pair of power lines, said control device comprising:

a connector box detachably mounted on said transformer housing;

a control unit installed in said connector box and including a bidirectional semiconductor switching element having a pair of power terminals and a gate terminal, said switching element being rendered ON when a trigger signal is supplied to said gate terminal, said control unit also including a trigger circuit connected between said gate terminal and one of said power terminals of said bidirectional semiconductor switching element for generating and supplying the trigger signal to said gate terminal in response to a control signal supplied to an input terminal of said trigger circuit, and said control unit further including a timer circuit for receiving the control signal and for generating a subsequent control signal starting at the rear end of said control signal and lasting for a preset timer interval, a power source circuit being connected to said power lines for converting the A.C. power into D.C. power which energizes said timer circuit; and a control signal generator for generating and supplying the control signal to the input terminal of said trigger circuit through a control signal transmission line;

said pair of power lines being led into said connector box, one of said power lines being connected to one of said power terminals of said bidirectional semiconductor switching element and the other of said power lines and the other of said power terminal being detachably connected with terminals of said primary winding primary winding through connector means, an output terminal of said timer circuit being provided for the output of said subsequent control signal from said control unit.

16. A neon signal control device according to claim 15 wherein at least one further said control unit in a said connector box and at least one further neon transformer in a said transformer housing are provided, respective pairs of said power lines being led out of said connector boxes and connected in parallel with said A.C. power source, said control units being successively connected in cascade so that the output terminal of the said timer circuit in one of said connector boxes is connected to the input terminal of the said trigger circuit in a subsequent one of said connector boxes through said control signal transmission line.

17. A neon sign control device as set forth in claim 16, wherein the control signal generator is an oscillator which is installed in the first mentioned control unit and obtains working power from the d.c. power of the power source circuit in said control unit.

18. A neon sign control device as set forth in one of claims 10, 12 or 17, wherein oscillation output of the oscillator is square wave and adjusting means is installed to adjust length of interval of high level and length of interval of low level in the square wave.

19. A neon sign control device for controlling the ON and OFF condition of neon tubes connected across a secondary winding of a neon transformer in a transformer housing disposed near said neon tubes, A.C. power being supplied from an A.C. power source to a primary winding of said neon transformer through a pair of power lines, said control device comprising:
a connector box detachably mounted on said transformer housing;
a control unit installed in said connector box and including a bidirectional semiconductor switching element having a pair of power terminals and a gate terminal, said switching element being rendered ON when a trigger signal is supplied to said gate terminal, said control unit also including a trigger circuit connected between said gate terminal and one of said power terminals of said bidirectional semiconductor switching element for generating and supplying the trigger signal to said gate terminal in response to a control signal supplied to an input terminal of said trigger circuit, and said control unit further including a control signal generator for generating and supplying the control signal to the input terminal of said trigger circuit, said control signal generator comprising a brightness detecting circuit for detecting brightness below a preset level and generating a detection output when it becomes dark outside, a clock circuit for generating an operating signal during two clock times preset therein each day, and a gate circuit for receiving the detection output from said brightness detecting circuit and the operating signal from said clock circuit and operative to produce a logical product thereof as the control signal;
said pair of power line being led into said connector box, one of said power lines being connected to one of said power terminals of said bidirectional semiconductor switching element and the other of said power lines and the other of said power terminals being detachably connected with terminals of said primary winding through connector means.

20. A neon sign control device as set forth in one of claims 15 or 19 wherein the trigger circuit generates the trigger signal every half cycle of the a.c. power while the control signal is supplied.

21. A neon sign control device according to claim 20 wherein said trigger circuit comprises:
a gate resistor connected between said gate terminal and one of said power terminals of said bidirectional semiconductor switching element;
a bridge rectifier means having a pair of A.C. input terminals connected between said gate terminal and the other of said power terminals of said bidirectional semiconductor switching element and also having a pair of D.C. output terminals;
a thyristor connected between said D.C. output terminals and having a control gate;
a transistor switching circuit connected across said thyristor in parallel thereto, said transistor switching circuit including a series connection of a resistor and a switching transistor, the junction between said resistor and switching transistor being connected to said control gate of said thyristor so that, upon receipt of the control signal at the base of said switching transistor, said thyristor generates the trigger signal.

22. A neon sign control device according to claim 21 wherein said trigger circuit further comprises threshold means connected across said pair of D.C. output terminals for producing a detection output when a voltage across said pair of D.C. output terminals exceeds a threshold value; and switching means connected to said control gate of said thyristor for holding said thyristor OFF during the presence of said detection output of said threshold means whereby said control circuit, having received the control signal, produces the trigger signal which is allowed to rise over a time interval during which an absolute value of an instantaneous voltage of said A.C. power is lower than a predetermined value.

23. A neon sign control device according to one of claims 10, 12 or 16 wherein each of said connector boxes includes D.C. isolating signal coupling means for coupling signals between the input terminal of said trigger circuit and said control signal transmission line.

24. A neon sign control device as set forth in claim 23 wherein said signal coupling means is a photo coupler.

25. A neon sign control device according to one of claims 11, 12 or 16 wherein the signal transmitted between said control units are light signals passing through said control signal transmission lines formed as optical fibers, photo-electric conversion elements being provided at both ends of each said optical fiber.

* * * * *

UNITED STATES PATENT AND TRADEMARK OFFICE
CERTIFICATE OF CORRECTION

PATENT NO. : 4,629,946
DATED : December 16, 1986
INVENTOR(S) : Shintetsu Amano; Hajime Okada; Teruyuki Yakuda; Isao Hori, and Yoshinori Mizuhata It is certified that error appears in the above-identified patent and that said Letters Patent is hereby corrected as shown below:

Column 3 line 3 delete "such"

Column 5 line 32 change "plating" to --placing--

Column 10 line 37 after "outputs" insert --,--

Column 15 line 8 change "terminanl" to --terminal--

Column 16 line 61 change "termainal" to --terminal--

Column 17 line 1 delete "control" (first occurrence)

Column 18 line 30 change "signa" to --signal--

Column 19 line 7 delete "primary winding" (second occurrence)

Column 20 line 4 change "line" to --lines--
         line 58 change "11" to --10--; change "signal" to --signals--

Signed and Sealed this

Twenty-fourth Day of March, 1987

Attest:

DONALD J. QUIGG

Attesting Officer

Commissioner of Patents and Trademarks